United States Patent
Miller et al.

(10) Patent No.: US 10,599,508 B2
(45) Date of Patent: Mar. 24, 2020

(54) I/O ERROR DIAGNOSTICS

(71) Applicant: International Business Machines Corporation, Armonk, NY (US)

(72) Inventors: Dash D. Miller, St. Louis Park, MN (US); Joseph V. Malinowski, Bridgeview, IL (US); Tabor R. Powelson, Poughkeepsie, NY (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/616,921

(22) Filed: Jun. 8, 2017

(65) Prior Publication Data

US 2018/0357115 A1    Dec. 13, 2018

(51) Int. Cl.
*G06F 11/07* (2006.01)

(52) U.S. Cl.
CPC ........ *G06F 11/079* (2013.01); *G06F 11/0745* (2013.01); *G06F 11/0778* (2013.01)

(58) Field of Classification Search
CPC .................................................. G06F 11/079
USPC .......................................................... 714/43
See application file for complete search history.

(56) References Cited

U.S. PATENT DOCUMENTS

| | | | |
|---|---|---|---|
| 5,699,505 A | 12/1997 | Srinivasan | |
| 6,067,588 A | 5/2000 | Ito | |
| 6,636,908 B1* | 10/2003 | Winokur | G06F 13/122 709/233 |
| 9,400,704 B2 | 7/2016 | Graham et al. | |
| 2005/0022064 A1* | 1/2005 | Steinmetz | G06F 11/0727 714/42 |
| 2005/0278706 A1* | 12/2005 | Garza | G06F 11/3636 717/128 |
| 2008/0307267 A1* | 12/2008 | Chandrasekaran | G06F 11/3688 714/38.11 |
| 2011/0167302 A1* | 7/2011 | McCune | G06F 11/079 714/37 |

(Continued)

FOREIGN PATENT DOCUMENTS

| | | |
|---|---|---|
| CN | 1744049 A | 3/2006 |
| CN | 106708655 A | 5/2017 |

(Continued)

OTHER PUBLICATIONS

International Search Report and Written Opinion, International Application No. PCT/IB2018/054042, dated Sep. 28, 2018.

*Primary Examiner* — Matthew M Kim
*Assistant Examiner* — Indranil Chowdhury
(74) *Attorney, Agent, or Firm* — Nelson and Nelson; Daniel P. Nelson; Alexis V. Nelson

(57) ABSTRACT

A method for collecting diagnostic information associated with an I/O error is disclosed. In one embodiment, such a method includes detecting an error associated with an input/output (I/O) operation. The method determines whether the error can be re-driven and, if so, enables various diagnostic functions to improve collection of diagnostic information. The method then immediately re-drives the I/O operation associated with the error in order to recreate the error. Using the diagnostic functions that have been enabled, the method captures diagnostic information associated with the recreated error. A corresponding system and computer program product are also disclosed.

20 Claims, 7 Drawing Sheets

(56) References Cited

U.S. PATENT DOCUMENTS

| | | | |
|---|---|---|---|
| 2012/0226945 A1* | 9/2012 | Johnson | G06F 9/466 |
| | | | 714/37 |
| 2016/0246658 A1* | 8/2016 | Clarke | G06F 11/1474 |
| 2016/0266996 A1 | 9/2016 | Brunkhorst et al. | |
| 2016/0283305 A1 | 9/2016 | Kugata | |
| 2017/0097876 A1 | 4/2017 | Craddock et al. | |
| 2017/0255535 A1* | 9/2017 | Freeman | G06F 11/0766 |

FOREIGN PATENT DOCUMENTS

| | | |
|---|---|---|
| JP | 2004227645 A | 8/2004 |
| WO | WO2016105352 A1 | 6/2016 |
| WO | WO2016114794 A1 | 7/2016 |

* cited by examiner

I/O ERROR DIAGNOSTICS

BACKGROUND

Field of the Invention

This invention relates to systems and methods for collecting diagnostic information associated with an I/O error.

Background of the Invention

In the z/OS operating system, control blocks are used to manage the work and resources of a host system. These control blocks are represented internally as real, virtual, and/or hard storage areas and typically contain specific information pertaining to events, activity, and status occurring within the host system. Control blocks in most situations are chained to one another and can span many areas of the z/OS operating system's internal structure. Knowledge of control blocks is useful in determining vital information about the host system and its status when a failure occurs.

When an input/output (I/O) request is generated by an application running on a host system, the I/O driver builds a control block called an I/O Supervisor Block (IOSB). The IOSB describes the I/O request and passes parameters to and receives responses from an Input/Output Supervisor (IOS). When an I/O error occurs, information in the IOSB control block is often needed to identify what channel program was used to read/write data to a specific device. Unfortunately, by the time an SVC (Supervisor Control) dump is taken to ascertain the contents of an IOSB, the IOSB is often already reused by another application. As a result, data in the IOSB is often stale by the time the SVC dump is taken and is not useful to ascertain the root cause of the I/O error.

Diagnostic tools such as SVC dump that collect trace data are often disabled during normal operations to reduce overhead. Thus, trace data may not be collected the first time an I/O error occurs. Although a user may try to recreate the I/O error after enabling diagnostic tools, the I/O error often cannot be recreated or cannot be recreated in time to collect desired diagnostic information. This may make it difficult or impossible to determine the root cause of the I/O error.

In view of the foregoing, what are needed are systems and methods to more effectively collect diagnostic information associated with I/O errors.

SUMMARY

The invention has been developed in response to the present state of the art and, in particular, in response to the problems and needs in the art that have not yet been fully solved by currently available systems and methods. Accordingly, the invention has been developed to provide systems and methods to collect diagnostic information associated with I/O errors. The features and advantages of the invention will become more fully apparent from the following description and appended claims, or may be learned by practice of the invention as set forth hereinafter.

Consistent with the foregoing, a method for collecting diagnostic information associated with an I/O error is disclosed. In one embodiment, such a method includes detecting an error associated with an input/output (I/O) operation. The method determines whether the error can be re-driven and, if so, enables various diagnostic functions to improve collection of diagnostic information. The method then immediately re-drives the I/O operation associated with the error in order to recreate the error. Using the diagnostic functions that have been enabled, the method captures diagnostic information associated with the recreated error. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
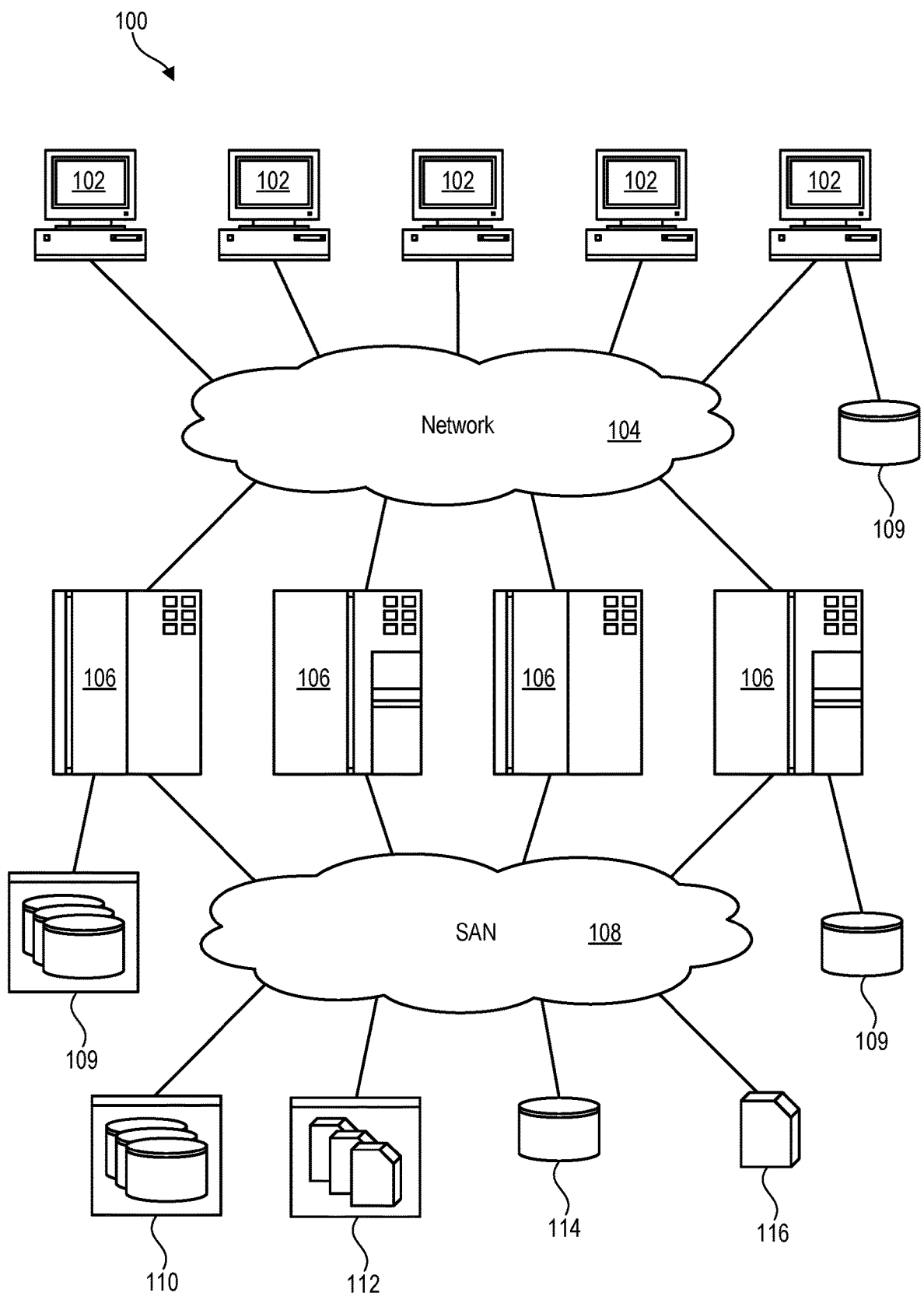
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
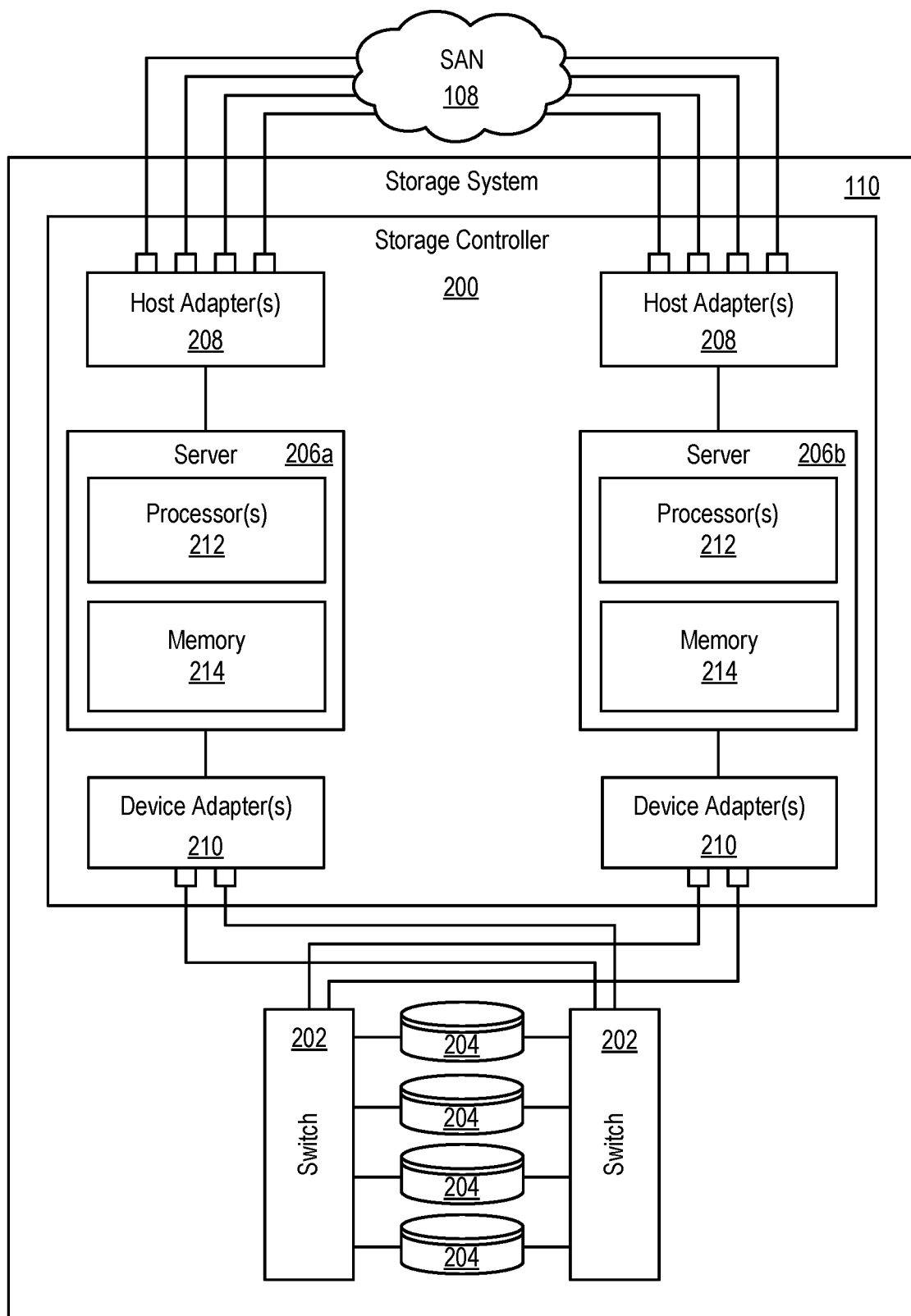
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
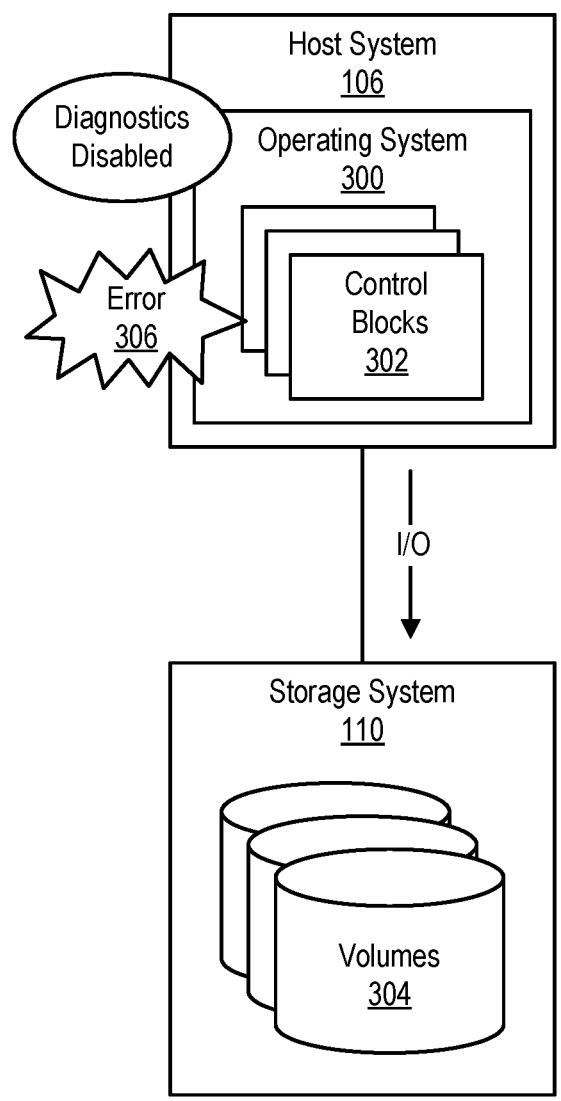
FIG. 3 is a high-level block diagram showing occurrence of an I/O error with various diagnostic functions disabled.

Referring to FIG. 3, as previously mentioned, in operating systems 300 such as z/OS, control blocks 302 are used to manage the work and resources of the host system 106 on which z/OS is running. These control blocks 302 are represented internally as real, virtual, and/or hard storage areas and typically contain specific information related to events, activity, and status occurring within the host system 106. Control blocks 302 in most situations are chained to one another and can span many areas of the z/OS operating system's internal structure. Knowledge of control blocks 302 is useful in determining vital information about the host system 106 and its status when a failure occurs.

When an input/output (I/O) request is generated by an application running on a host system 106 to access data in volumes 304 of a storage system 110, the I/O driver builds a control block 302 called an I/O Supervisor Block (IOSB). The IOSB control block 302 describes the I/O request and passes parameters to and receives responses from an Input/Output Supervisor (IOS). When an I/O error 306 occurs, information in the IOSB control blocks 302 is often needed to identify what channel program was used to read/write data to a specific device. Unfortunately, by the time an SVC (Supervisor Control) dump is taken to ascertain the contents of an IOSB control block 302, the IOSB control block 302 is often already reused by another application. As a result, data in the IOSB control block 302 is often stale by the time the SVC dump is taken and is not useful to ascertain the root cause of the I/O error 306.

Diagnostic tools such as SVC dump that collect trace data are often disabled (as shown in FIG. 3) during normal operations to reduce overhead. Thus, trace data may not be collected the first time an I/O error 306 occurs. Although a user may try to recreate the I/O error 306 after enabling diagnostic tools, the I/O error 306 often cannot be recreated or cannot be recreated in time to collect desired diagnostic information. This may cause a delay or inability to determine the root cause of an I/O error 306.

Figure 4:
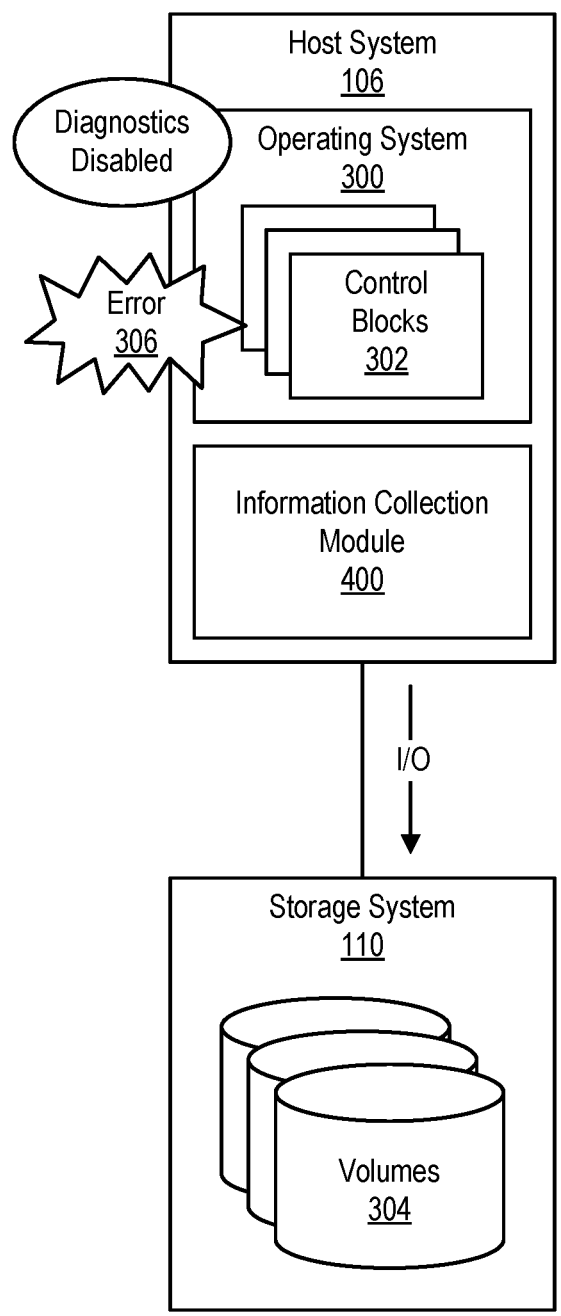
FIG. 4 is a high-level block diagram showing an information collection module configured to improve information gathering upon occurrence of an I/O error.

Referring to FIG. 4, in order to more effectively gather diagnostic information associated with an I/O error 306, an information collection module 400 may be provided in or in association with the host system 106. In general, the information collection module 400 may monitor for I/O errors 306 occurring in association with I/O operations. As shown in FIG. 4, during normal operations, diagnostic functions such as trace functions may be disabled to reduce overhead on the host system 106 and/or storage system 110. When an I/O error 306 is detected, the information collection module 400 may determine whether the I/O error 306 can be re-driven (i.e. perform operations that will cause the I/O error 306 to occur again).

Figure 5:
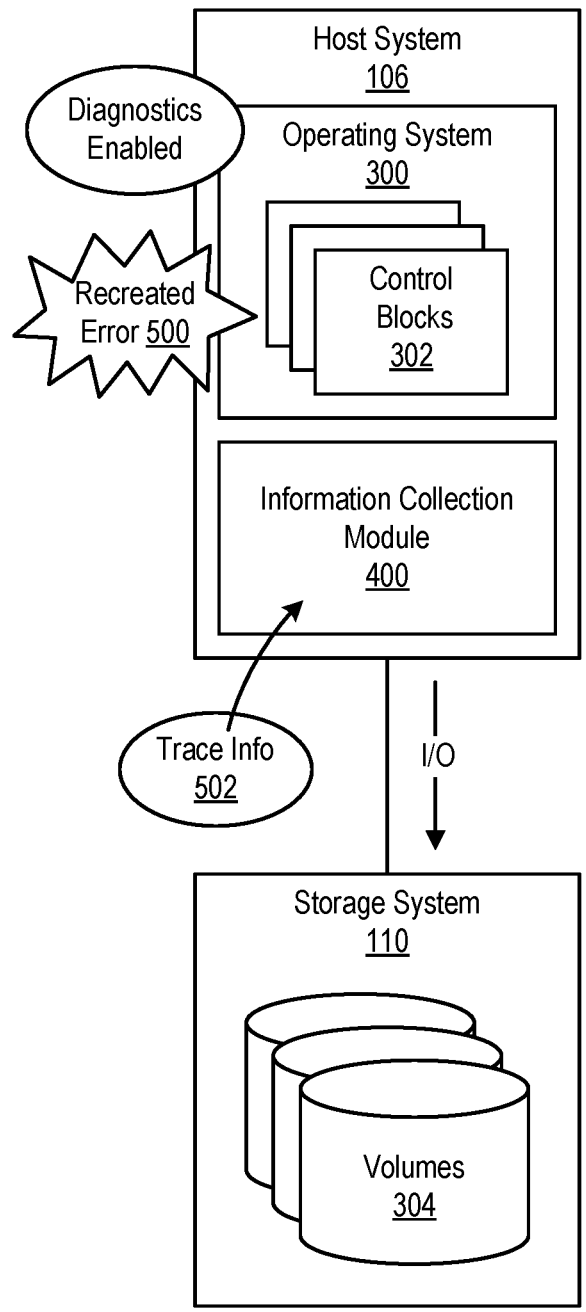
FIG. 5 is a high-level block diagram showing how the information collection module enables diagnostic functions to gather information associated with a recreated I/O error.

If the I/O error 306 can be re-driven, the information collection module 400 enables various diagnostic functions on the host system 106 and/or storage system 110 to improve data collection, and immediately re-drives the I/O that caused the I/O error 306, as shown in FIG. 5. This will ideally cause the I/O error 306 to reoccur (shown as recreated error 500). Because the diagnostic functions are enabled, this will allow the information collection module 400 to collect various types of diagnostic information that would not otherwise be collected. For example, trace information 502 such as that generated by an SVC dump may be collected by the information collection module 400. Because the information collection module 400 immediately re-drives the I/O that caused the I/O error 306, data gathered from data structures such as control blocks 302 may be valid as opposed to stale.

The above-described techniques are advantageous in that they allow various diagnostic functions to be disabled during normal operations to reduce overhead. In certain embodiments, only when an I/O error 306 is detected are diagnostic functions enabled. Once an I/O error 306 is recreated and associated diagnostic information is gathered, the diagnostic functions may again be disabled to reduce overhead. In certain embodiments, the diagnostic functions may be disabled after a certain amount of time. In other embodiments, the diagnostic functions are disabled immediately after desired diagnostic information is gathered. In yet other embodiments, the diagnostic functions are disabled after re-driving I/O a selected number of times or until an I/O error 306 is recreated and diagnostic information is gathered, whichever comes first. In any event, diagnostic functions that are enabled may be disabled after some amount of time or some specified event to reduce overhead on the host system 106 and/or storage system 110.

Figure 6:
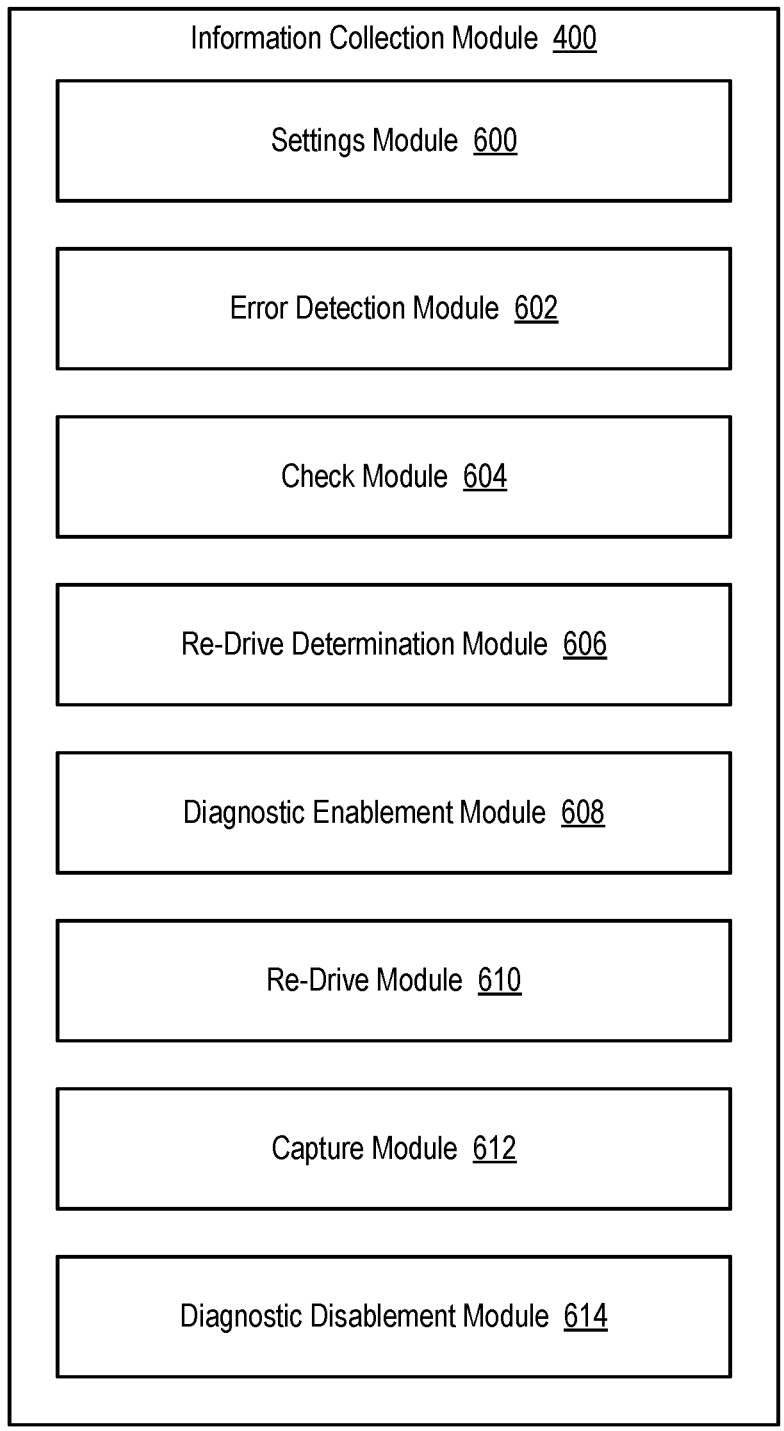
FIG. 6 is a high-level block diagram showing the information collection module and various associated sub-modules.

Referring to FIG. 6, the information collection module 400 may include various sub-modules that provide various features and functions. These sub-modules may be implemented in hardware, software, firmware, or combinations thereof. The sub-modules are presented by way of example and are not intended to represent an exhaustive list of sub-modules that may be included in the information collection module 400. The information collection module 400 may include more or fewer modules than those illustrated. As shown, the information collection module 402 includes one or more of a settings module 600, error detection module 602, check module 604, re-drive determination module 606, diagnostic enablement module 608, re-drive module 610, capture module 612, and diagnostic disablement module 614.

The settings module 600 may enable a user to manually turn on improved information collection for particular jobs or address spaces. In certain embodiments, improved information collection may be turned on for jobs that that a user feels are critical or error-prone. There are various ways this may be accomplished. For example, a user may set a parameter (e.g., a SYS1.PARMLIB member) to activate information collection for a job at the time of an initial program load (IPL) or manually issue a console command to activate information collection for a specific job or address space ID number (ASID). Using either of these techniques, the settings module 600 may turn on a bit in an address space control block 302 (ASCB) at job initialization time to indicate that enhanced information collection (e.g., tracing) is active.

In certain embodiments, the settings module 600 may be configured to enable information collection for a particular address space such that diagnostic information is collected each time data is changed, logic is invoked, or other events occur in the address space. The impact of this information collection can be minimized by reducing an amount of data that is collected or saved each time information is collected. Automation may also be used to turn information collection off during times of peak workload and back on during periods of low workload. Each of these options may be controlled via SYS1.PARMLIB parameters.

The error detection module 602 may detect when I/O errors 306 occur. When an I/O error 306 does occur, the check module 604 may check whether information collection is enabled for the job. This may be accomplished, for example, by checking the bit in the ASCB associated with the job. The re-drive determination module 606 may also check whether the I/O error 306 is re-drivable. If the I/O error 306 is re-drivable and information collection is enabled for the job, the diagnostic enablement module 608 may enable various diagnostic functions to improve diagnostic information gathering. For example, the diagnostic enablement module 608 may enable diagnostic tools such as SVC dumps that collect trace data.

The re-drive module 610 may then immediately re-drive the I/O operation that caused the initial I/O error 306. Ideally, this will recreate the I/O error 306. The capture module 612 will then capture information gathered by the diagnostic functions. In certain embodiments, the capture module 612 may capture information indicated in the SYS1.PARMLIB parameters previously discussed. In certain embodiments, default information that is captured and saved includes data from the most recent IOSB control blocks 302, the first 128 bytes of data being read/written, and the last 128 bytes of data being read/written. The capture module 612 may, in certain embodiments, store the diagnostic information in a predefined storage area in the same address space in which the I/O error 306 was detected.

Once desired diagnostic information has been captured, the diagnostic disablement module 614 may disable diagnostic functions that were enabled by the diagnostic enablement module 608. Alternatively, the diagnostic disablement module 614 may disable the diagnostic functions once a certain amount of time has passed, or after a certain number of attempts to recreate the I/O error 306.

In certain embodiments, the error detection module 602 monitors for all types of I/O errors 306 from all types of jobs. If an I/O error 306 is re-drivable, the diagnostic enablement module 608 will enable diagnostic functions and the re-drive module 610 will re-drive the I/O operation associated with the I/O error 306. This will ideally recreate the I/O error 306. The capture module 612 may then capture diagnostic information associated with the I/O error 306. In certain embodiments, the settings module 600 may also automatically set the parameter to activate information collection for the job that experienced the I/O error 306. Any further I/O error 306 associated with this job may then trigger information collection. If an I/O error 306 is not re-drivable, depending on the user settings, information collection may also be automatically triggered to start saving data for an future run of the job. This will help to ensure that information collection is active for any rerun of the same job. The information collected will provide additional details regarding the nature of the I/O error 306. These details in many cases will allow root cause to be determined without needing to collect additional traces or diagnostics with a recreated I/O error 500.

Figure 7:
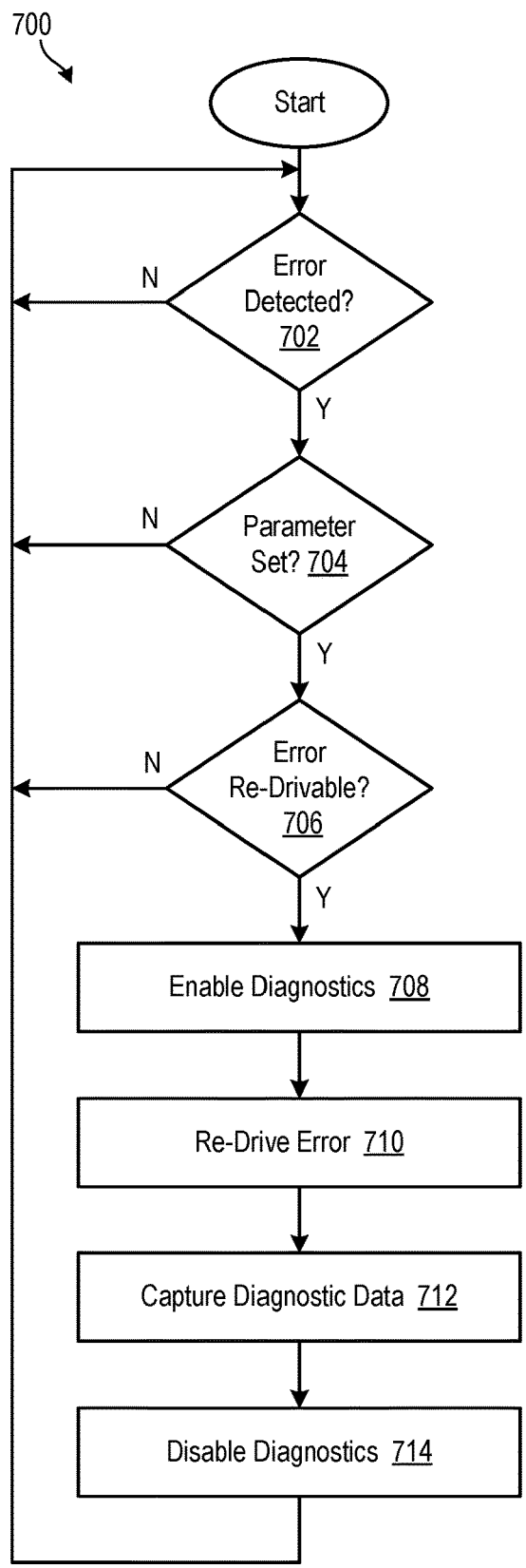
FIG. 7 shows one example of a method for collecting diagnostic information associated with an I/O error.

Referring to FIG. 7, one embodiment of a method 700 for collecting diagnostic information associated with an I/O error 306 is illustrated. As shown, the method 700 initially determines 702 whether an I/O error 306 has been detected. Is so, the method 700 determines 704 whether a parameter to activate information collection is set for the job associated with the I/O error 306. If so, the method 700 determines 706 whether the I/O error 306 is re-drivable. If the I/O error 306 is re-drivable, the method 700 enables 708 diagnostic functions to improve diagnostic information collection and the method 700 re-drives 710 the I/O that caused the initial I/O error 306. This will ideally recreate the I/O error 306. Once recreated, the method 700 captures 712 diagnostic information associated with the I/O error 306. The method 700 then disables 714 the diagnostic functions to reduce overhead.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for collecting diagnostic information associated with an error, the method comprising:
   detecting an error associated with an input/output (I/O) operation;
   determining whether the I/O operation is associated with a particular job or a particular address space;
   if the I/O operation is associated with the particular job or the particular address space, performing the following:
      enabling various diagnostic functions to improve collection of diagnostic information;
      immediately re-driving the I/O operation associated with the error in order to recreate the error;
      capturing diagnostic information associated with the recreated error using the enabled diagnostic functions;
      enabling the diagnostic functions for future runs of the particular job or the particular address space;
      monitoring for future runs of the particular job or the particular address space; and
      upon detecting future runs of the particular job or the particular address space, triggering collection of the diagnostic information using the diagnostic functions.

2. The method of claim 1, wherein capturing the diagnostic information comprises capturing the diagnostic information in a pre-defined storage area.

3. The method of claim 2, wherein capturing the diagnostic information in a pre-defined storage area comprises capturing the diagnostic information in an address space of the particular job.

4. The method of claim 1, further comprising enabling diagnostic information collection for the particular job prior to detecting the error.

5. The method of claim 1, wherein enabling various diagnostic functions comprises enabling at least one tracing function.

6. The method of claim 1, further comprising disabling the diagnostic functions after a certain period of time.

7. The method of claim 1, further comprising disabling the diagnostic functions upon occurrence of a specified event.

8. A computer program product for collecting diagnostic information associated with an error, the computer program product comprising a non-transitory computer-readable storage medium having computer-usable program code embodied therein, the computer-usable program code configured to perform the following when executed by at least one processor:
   detect an error associated with an input/output (I/O) operation;
   determine whether the I/O operation is associated with a particular job or a particular address space;
   if the I/O operation is associated with the particular job or the particular address space, perform the following:
      enable various diagnostic functions to improve collection of diagnostic information;
      immediately re-drive the I/O operation associated with the error in order to recreate the error;
      capture diagnostic information associated with the recreated error using the enabled diagnostic functions;
      enable the diagnostic functions for future runs of the particular job or the particular address space;
      monitor for future runs of the particular job or the particular address space; and
      upon detecting future runs of the particular job or the particular address space, trigger collection of the diagnostic information using the diagnostic functions.

9. The computer program product of claim 8, wherein capturing the diagnostic information comprises capturing the diagnostic information in a pre-defined storage area.

10. The computer program product of claim 9, wherein capturing the diagnostic information in a pre-defined storage area comprises capturing the diagnostic information in an address space of the particular job.

11. The computer program product of claim 8, wherein the computer-usable program code is further configured to enable diagnostic information collection for the particular job prior to detecting the error.

12. The computer program product of claim 8, wherein enabling various diagnostic functions comprises enabling at least one tracing function.

13. The computer program product of claim 8, wherein the computer-usable program code is further configured to disable the diagnostic functions after a certain period of time.

14. The computer program product of claim 8, wherein the computer-usable program code is further configured to disable the diagnostic functions upon occurrence of a specified event.

15. A system for collecting diagnostic information associated with an error, the system comprising:
   at least one processor;
   at least one memory device operably coupled to the at least one processor and storing instructions for execution on the at least one processor, the instructions causing the at least one processor to:
      detect an error associated with an input/output (I/O) operation;
      determine whether the I/O operation is associated with the particular job or the particular address space;
      if the I/O operation is associated with the particular job or the particular address space, perform the following:
         enable various diagnostic functions to improve collection of diagnostic information;
         immediately re-drive the I/O operation associated with the error in order to recreate the error;
         capture diagnostic information associated with the recreated error using the enabled diagnostic functions;
      enable the diagnostic functions for future runs of the particular job or the particular address space;
      monitor for future runs of the particular job or the particular address space; and
      upon detecting future runs of the particular job or the particular address space, trigger collection of the diagnostic information using the diagnostic functions.

16. The system of claim 15, wherein capturing the diagnostic information comprises capturing the diagnostic information in a pre-defined storage area.

17. The system of claim 16, wherein capturing the diagnostic information in a pre-defined storage area comprises capturing the diagnostic information in an address space of the particular job.

18. The system of claim 15, wherein the instructions further cause the at least one processor to enable diagnostic information collection for the particular job prior to detecting the error.

19. The system of claim 15, wherein the instructions further cause the at least one processor to disable the diagnostic functions after a certain period of time.

20. The system of claim 15, wherein the instructions further cause the at least one processor to disable the diagnostic functions upon occurrence of a specified event.

\* \* \* \* \*